United States Patent
Ono et al.

(10) Patent No.: US 9,576,186 B2
(45) Date of Patent: Feb. 21, 2017

(54) IMAGE PROCESSING APPARATUS, IMAGE PROCESSING METHOD, AND NON-TRANSITORY COMPUTER READABLE MEDIUM

(71) Applicant: FUJI XEROX CO., LTD., Minato-ku, Tokyo (JP)

(72) Inventors: Masafumi Ono, Kanagawa (JP); Manabu Hayashi, Kanagawa (JP); Naoya Nobutani, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 0 days.

(21) Appl. No.: 14/219,274

(22) Filed: Mar. 19, 2014

(65) Prior Publication Data

US 2015/0047018 A1 Feb. 12, 2015

(30) Foreign Application Priority Data

Aug. 9, 2013 (JP) ................................. 2013-166813

(51) Int. Cl.
| | |
|---|---|
| G06F 7/04 | (2006.01) |
| G06F 21/30 | (2013.01) |
| G06K 9/00 | (2006.01) |
| G06F 21/31 | (2013.01) |
| G06F 21/32 | (2013.01) |

(52) U.S. Cl.
CPC ........... *G06K 9/00221* (2013.01); *G06F 21/31* (2013.01); *G06F 21/32* (2013.01)

(58) Field of Classification Search
None
See application file for complete search history.

(56) References Cited

U.S. PATENT DOCUMENTS

| | | | |
|---|---|---|---|
| 5,418,969 A | 5/1995 | Matsuzaki et al. | |
| 2007/0058841 A1 | 3/2007 | Miura et al. | |
| 2010/0011439 A1* | 1/2010 | Takiyama | G06F 21/34 726/19 |
| 2010/0053661 A1 | 3/2010 | Ushiku | |
| 2010/0263044 A1* | 10/2010 | Yamada | G06F 3/1222 726/17 |
| 2013/0015946 A1* | 1/2013 | Lau et al. | 340/5.2 |

(Continued)

FOREIGN PATENT DOCUMENTS

| | | |
|---|---|---|
| JP | 3-286213 A | 12/1991 |
| JP | 2000-30066 A | 1/2000 |

(Continued)

OTHER PUBLICATIONS

Communication dated Aug. 4, 2015 from the Japanese Patent Office in counterpart application No. 2014-087100.

*Primary Examiner* — Farid Homayounmehr
*Assistant Examiner* — Olanrewaju Bucknor
(74) *Attorney, Agent, or Firm* — Sughrue Mion, PLLC

(57) ABSTRACT

An image processing apparatus includes an imaging unit, an authenticating unit, and a controller. The imaging unit acquires a face image of a user. The authenticating unit performs a first authentication process based on the face image and a second authentication process based on information other than the face image. The controller suspends the first authentication process based on the face image while maintaining the imaging unit in an activated state when the authenticating unit performs the second authentication process.

9 Claims, 8 Drawing Sheets

(56) References Cited

U.S. PATENT DOCUMENTS

| | | | |
|---|---|---|---|
| 2013/0047232 A1* | 2/2013 | Tuchman | H04L 9/3226 726/7 |
| 2013/0083344 A1 | 4/2013 | Funakawa | |
| 2013/0205156 A1* | 8/2013 | Niitsuma | G06F 1/3287 713/324 |
| 2014/0133713 A1* | 5/2014 | Kim et al. | 382/118 |
| 2014/0165187 A1* | 6/2014 | Daesung et al. | 726/19 |

FOREIGN PATENT DOCUMENTS

| | | |
|---|---|---|
| JP | 2000-200113 A | 7/2000 |
| JP | 2007-75305 A | 3/2007 |
| JP | 2008-4003 A | 1/2008 |
| JP | 2010-62637 A | 3/2010 |
| JP | 2010-277504 A | 12/2010 |
| JP | 2013-80114 A | 5/2013 |

\* cited by examiner

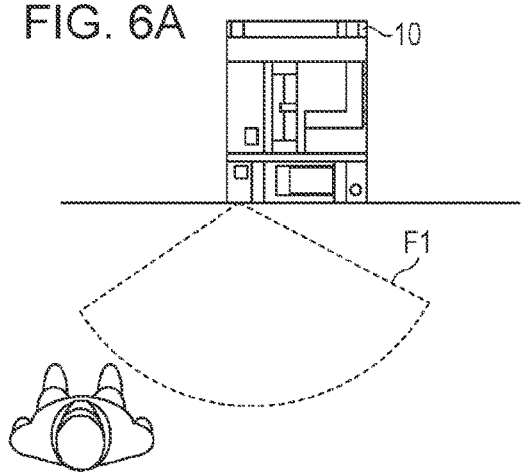
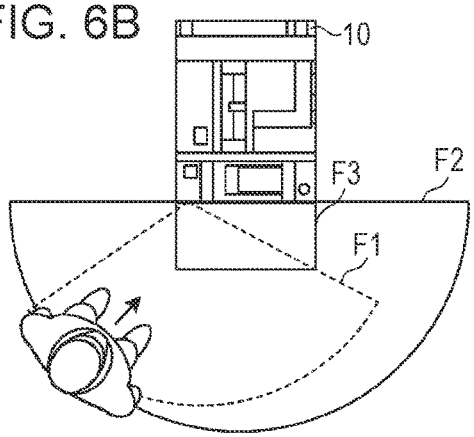
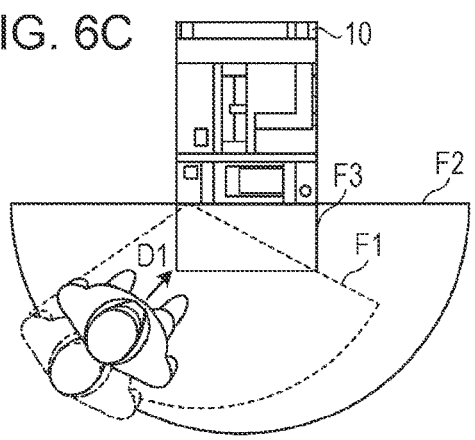
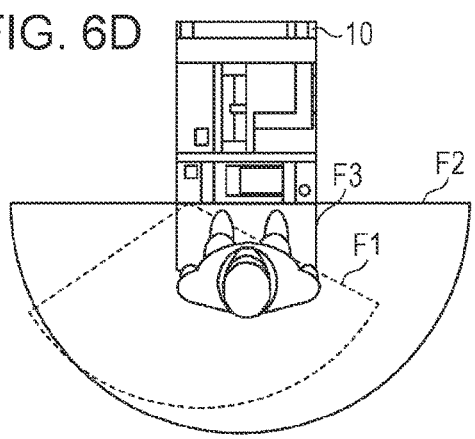
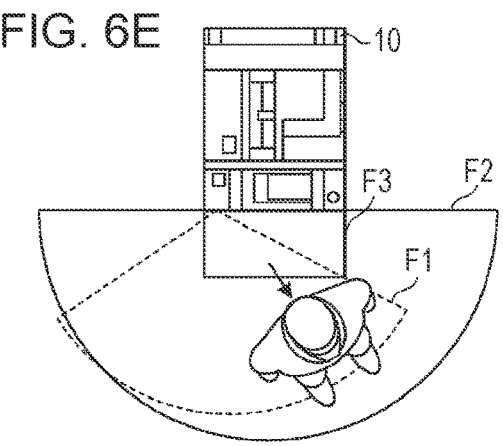
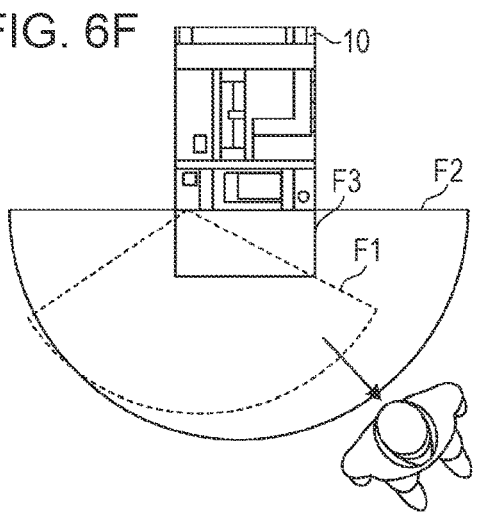

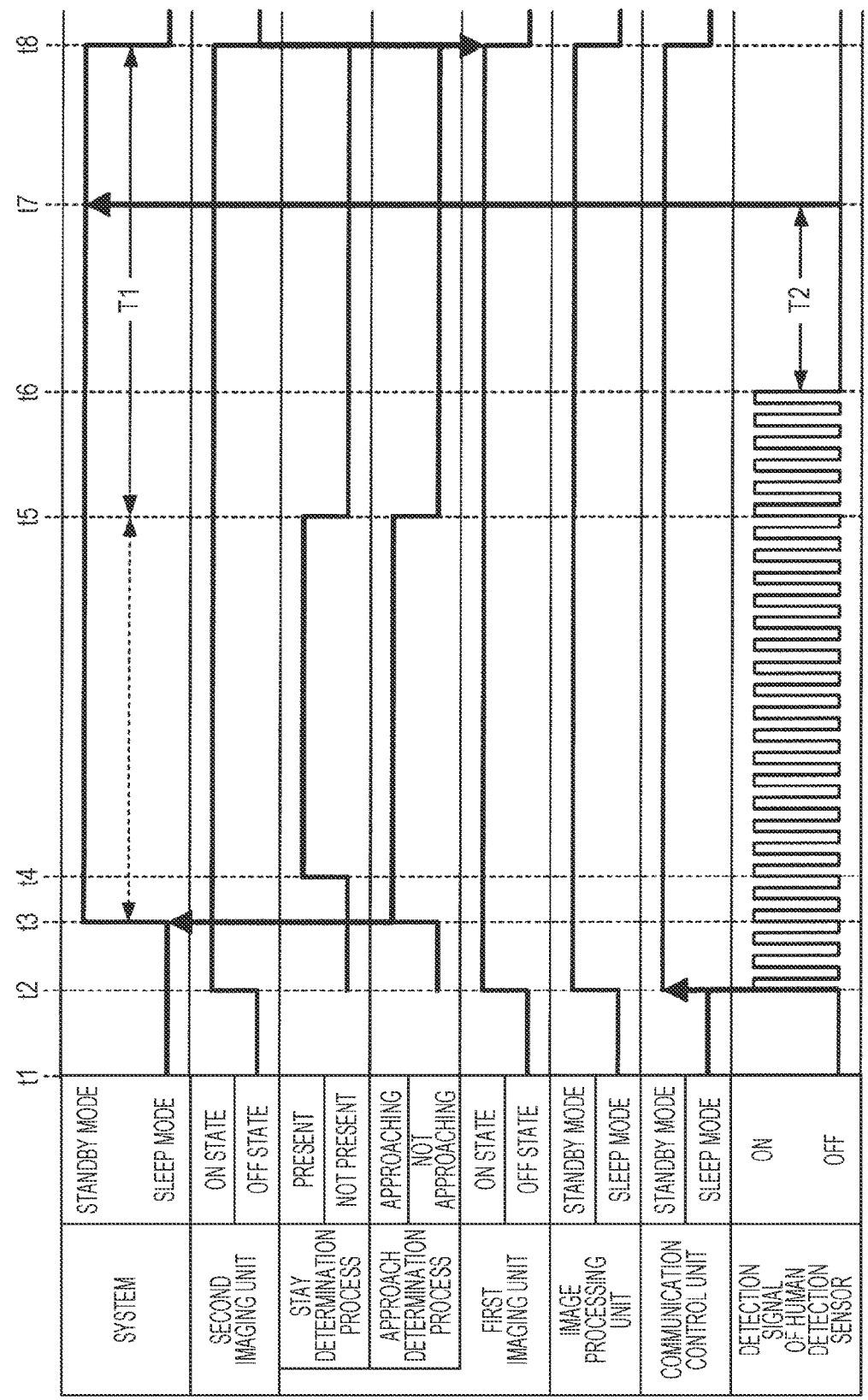

FIG. 10
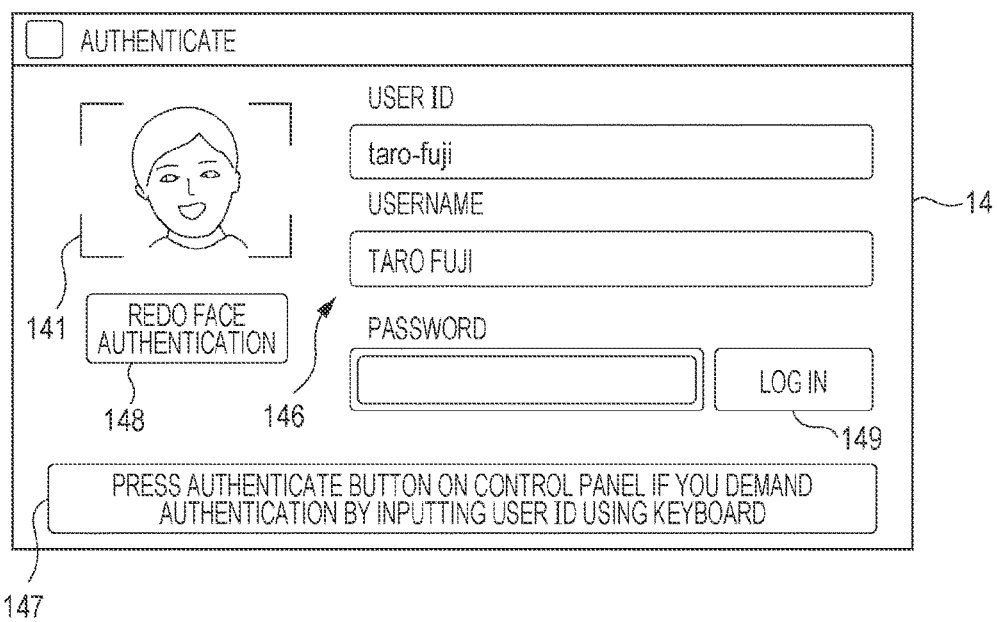
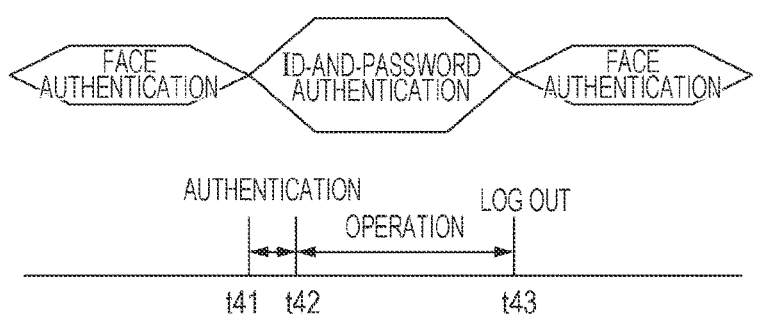
FIG. 11A
FIG. 11B
FIG. 11C
FIG. 11D

FIG. 12

| | |
|---|---|
| A — Authenticate screen: "FIT YOUR FACE INTO FRAME WHILE VIEWING SCREEN", DISPLAY CAMERA IMAGE, HELP | SECOND IMAGING UNIT: ON<br>FACE AUTHENTICATION: EXECUTE |
| B — Authenticate screen: USER ID (taro-fuji), USERNAME (TARO FUJI), PASSWORD, LOG IN, REDO FACE AUTHENTICATION. "PRESS AUTHENTICATE BUTTON ON CONTROL PANEL IF YOU DEMAND AUTHENTICATION BY INPUTTING USER ID USING KEYBOARD" | SECOND IMAGING UNIT: ON<br>FACE AUTHENTICATION: SUSPEND |
| C — Keyboard screen with CANCEL, ENTER, CLEAR ALL, INPUT MODE (SINGLE-BYTE), KEYBOARD LAYOUT (ALPHANUMERIC / JAPANESE ALPHABET), on-screen keyboard | SECOND IMAGING UNIT: ON<br>FACE AUTHENTICATION: SUSPEND |
| D — Authenticate screen: "AUTHENTICATION ERROR — PASSWORD IS NOT CORRECT", CLOSE | SECOND IMAGING UNIT: ON<br>FACE AUTHENTICATION: SUSPEND |

IMAGE PROCESSING APPARATUS, IMAGE PROCESSING METHOD, AND NON-TRANSITORY COMPUTER READABLE MEDIUM

CROSS-REFERENCE TO RELATED APPLICATIONS

This application is based on and claims priority under 35 USC 119 from Japanese Patent Application No. 2013-166813 filed Aug. 9, 2013.

BACKGROUND

Technical Field

The present invention relates to image processing apparatuses, image processing methods, and non-transitory computer readable media.

SUMMARY

According to an aspect of the invention, there is provided an image processing apparatus including an imaging unit, an authenticating unit, and a controller. The imaging unit acquires a face image of a user. The authenticating unit performs a first authentication process based on the face image and a second authentication process based on information other than the face image. The controller suspends the first authentication process based on the face image while maintaining the imaging unit in an activated state when the authenticating unit performs the second authentication process.

BRIEF DESCRIPTION OF THE DRAWINGS

An exemplary embodiment of the present invention will be described in detail based on the following figures, wherein:

FIGS. 6A to 6F are plan views illustrating the positional relationship between the image processing apparatus and a human;

FIG. 7 illustrates a timing chart of the image processing apparatus;

FIG. 10 illustrates a display screen used for inputting a user ID and a password;

FIGS. 11A to 11D illustrate timing charts showing the relationship between an enable signal and switching between face authentication and ID-and-password authentication; and FIG. 12 illustrates the relationships among the state of the display screen, a second imaging unit, and the state of face authentication.

DETAILED DESCRIPTION

An exemplary embodiment of the present invention will be described below with reference to the drawings.

Figure 1:
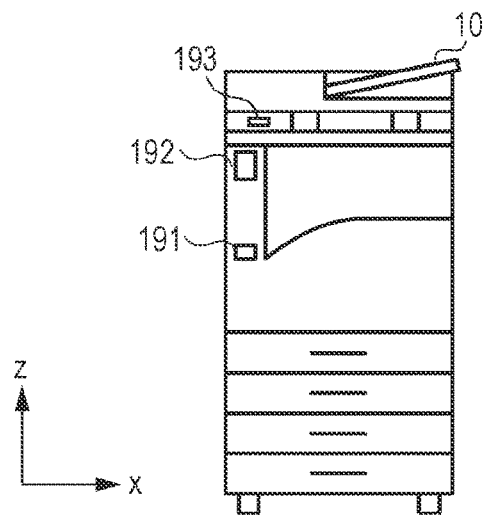
FIG. 1 is a front view of an image processing apparatus.
Figure 2:
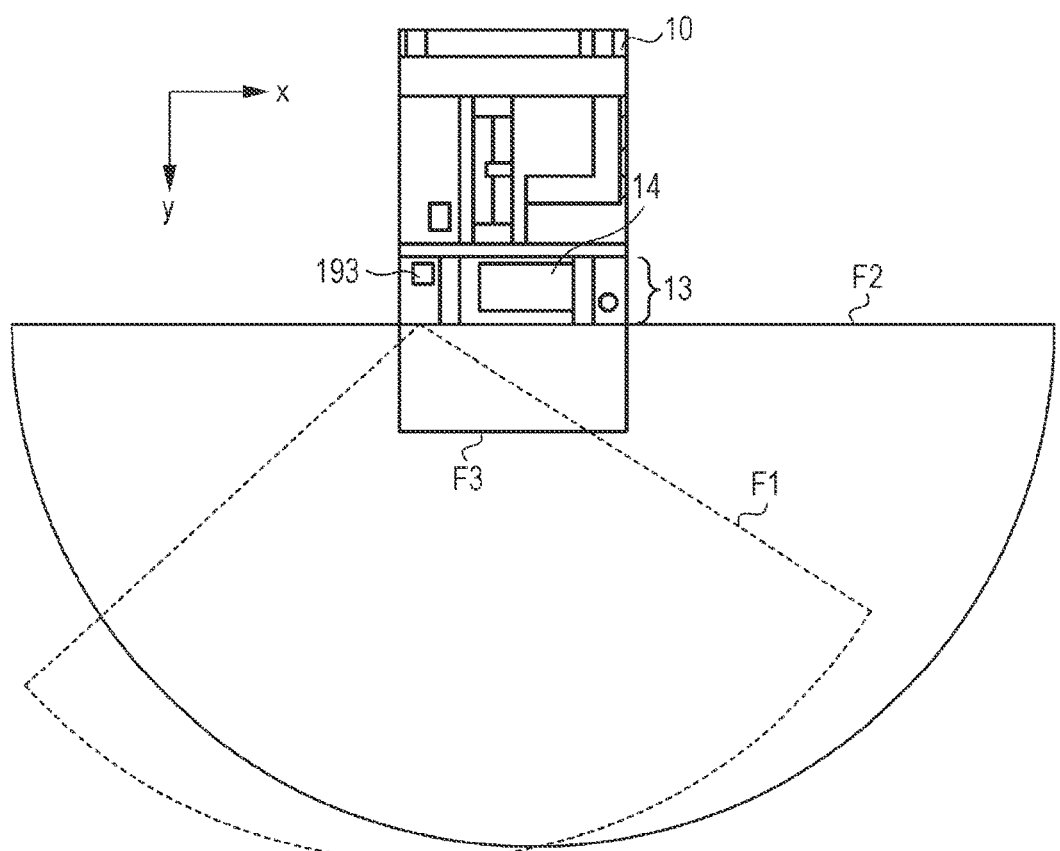
FIG. 2 is a top view of the image processing apparatus.

FIG. 1 is a front view of an image processing apparatus 10 according to this exemplary embodiment. FIG. 2 is a top view of the image processing apparatus 10.

The image processing apparatus 10 includes a human detection sensor 191, a first imaging unit 192, and a second imaging unit 193.

The human detection sensor 191 is, for example, an infrared sensor and is provided at a front surface of a housing of the image processing apparatus 10. The human detection sensor 191 detects a human existing within a detection region F1 shown in FIG. 2 and outputs a detection signal. The detection region F1 is set at the front side of the image processing apparatus 10 and is set as, for example, a 1500-mm-radius fan-shaped region ranging between 90 degrees and 135 degrees centered on the human detection sensor 191.

The first imaging unit 192 is, for example, a camera equipped with a wide-angle lens and is provided at the front surface of the housing of the image processing apparatus 10. The first imaging unit 192 acquires an image of a detection region F2 shown in FIG. 2. The detection region F2 is set at the front side of the image processing apparatus 10 and is set as, for example, a 1000-mm-radius semicircle region centered on the first imaging unit 192.

The second imaging unit 193 is, for example, a camera and is provided adjacent to an operable unit 13 and a display unit 14 at an upper surface of the housing of the image processing apparatus 10. The second imaging unit 193 acquires a face image of a user using the image processing apparatus 10.

An operation region F3 in FIG. 2 is a region where the user stays when operating the image processing apparatus 10 and is set adjacent to the image processing apparatus 10 at the front side of the image processing apparatus 10.

Figure 3:
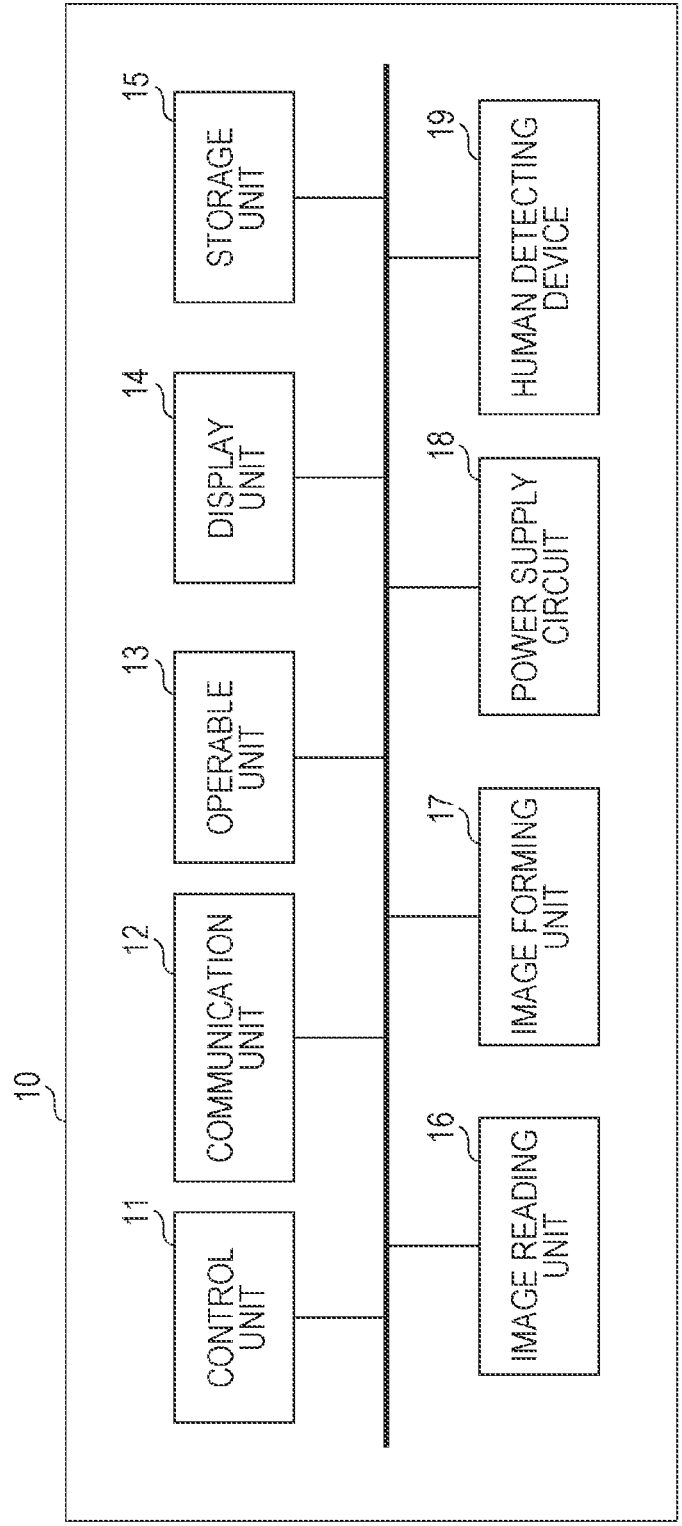
FIG. 3 is a configuration block diagram of the image processing apparatus.

FIG. 3 is a configuration block diagram of the image processing apparatus 10. The image processing apparatus 10 includes a control unit 11, a communication unit 12, the operable unit 13, the display unit 14, a storage unit 15, an image reading unit 16, an image forming unit 17, a power supply circuit 18, and a human detecting device 19.

The control unit 11 is equipped with, for example, a central processing unit (CPU) and a memory and controls each unit of the image processing apparatus 10. The CPU reads a program stored in the memory or the storage unit 15 and executes the program. The memory is equipped with a read-only memory (ROM) and a random access memory (RAM). The ROM stores programs and various kinds of data in advance. The RAM temporarily stores a program or data and functions as a working area when the CPU executes a program.

The communication unit 12 is a communication interface connected to a communication line. Via the communication line, the communication unit 12 communicates with another image processing apparatus 10 or a client device connected to the communication line.

The operable unit 13 includes, for example, a touch-screen and buttons and supplies data according to user's operation to the control unit 11.

The display unit 14 is, for example, a liquid crystal display and displays various kinds of information. The operable unit 13 and the display unit 14 are provided at the upper surface of the housing of the image processing apparatus 10. The operable unit 13 and the display unit 14 may be integrally provided in the form of a touch-screen.

The storage unit 15 is, for example, a hard disk or a semiconductor memory and stores various kinds of programs and data to be used by the control unit 11.

The image reading unit 16 is an image scanner and generates image data by reading an image of a document.

The image forming unit 17 forms an image according to the image data onto a sheet-shaped medium, such as paper. The image forming unit 17 may form an image based on electrophotography or may form an image based on another method. The image forming unit 17 generally functions as a printer.

The power supply circuit 18 supplies electric power to each unit of the image processing apparatus 10.

The human detecting device 19 is configured to detect a user using the image processing apparatus 10 and specifically includes the human detection sensor 191, the first imaging unit 192, and the second imaging unit 193.

Figure 4:
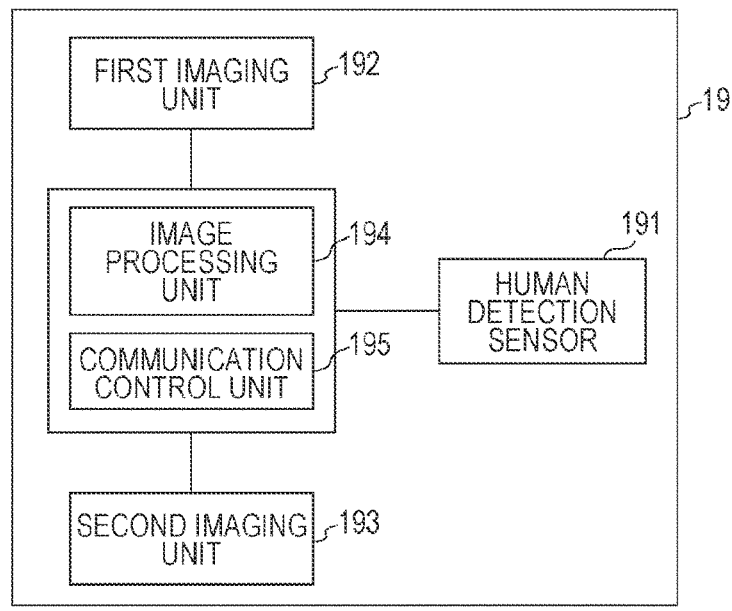
FIG. 4 is a configuration block diagram of a human detecting device of the image processing apparatus.

FIG. 4 is a configuration block diagram of the human detecting device 19. The human detecting device 19 includes the human detection sensor 191, the first imaging unit 192, the second imaging unit 193, an image processing unit 194, and a communication control unit 195.

The image processing unit 194 analyzes an image acquired by the first imaging unit 192 and an image acquired by the second imaging unit 193 and executes various kinds of processing. The image processing unit 194 may be constituted by an application specific integrated circuit (ASIC) as an alternative to a CPU and a memory.

The communication control unit 195 controls communication between the human detecting device 19 and the control unit 11. Specifically, when a human is detected based on an image acquired by the first imaging unit 192 or the second imaging unit 193, a detection signal is transmitted to the control unit 11.

Figure 5:
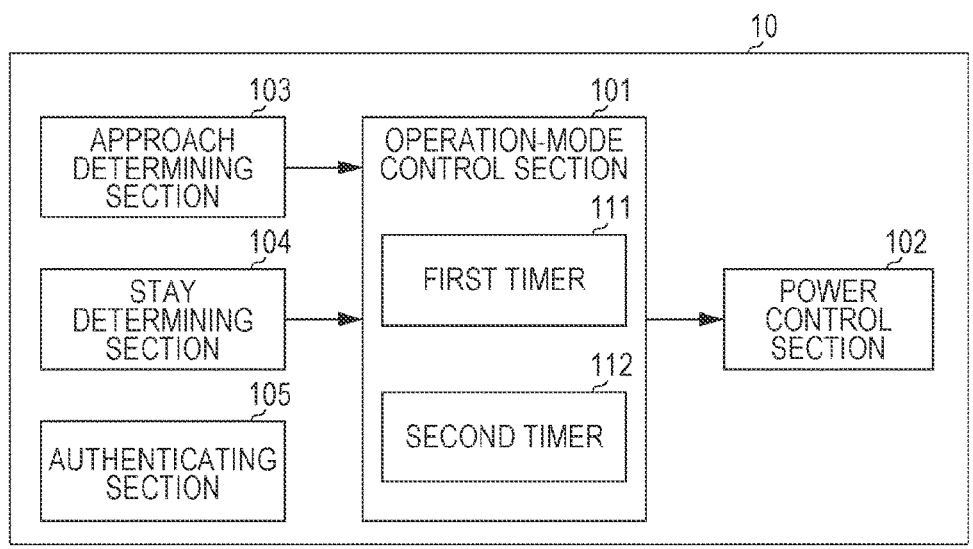
FIG. 5 is a functional block diagram of the image processing apparatus.

FIG. 5 is a functional block diagram of the image processing apparatus 10. The image processing apparatus 10 functionally includes an operation-mode control section 101, a power control section 102, an approach determining section 103, a stay determining section 104, and an authenticating section 105.

The operation-mode control section 101 is executed by the control unit 11 and controls the operation mode of each unit of the image processing apparatus 10. The operation-mode control section 101 controls the system operation mode of the image processing apparatus 10, the operation mode of the first imaging unit 192 and the second imaging unit 193, and the operation mode of the image processing unit 194 and the communication control unit 195. The term "system" refers to the configuration excluding the human detecting device 19 in the image processing apparatus 10 and includes, for example, the image reading unit 16 and the image forming unit 17.

The system operation mode includes a standby mode and a sleep mode. In the standby mode, electric power to be used for operation is supplied to the system so that the system is set in an operable state. When the system switches to the standby mode, the image processing apparatus 10 executes a scanning process, a copying process, a printing process, or a facsimile process in accordance with user's operation. In the sleep mode, the supply of electric power to at least one unit of the system is stopped so that at least one unit of the system becomes in a non-operable state. In the sleep mode, the supply of electric power to a section of the control unit 11, the display unit 14, the image reading unit 16, and the image forming unit 17 is stopped.

The operation mode of the first imaging unit 192 and the second imaging unit 193 includes an on state and an off state. In the on state, electric power is supplied to the first imaging unit 192 and the second imaging unit 193 so that the first imaging unit 192 and the second imaging unit 193 are turned on. In the off state, the supply of electric power to the first imaging unit 192 and the second imaging unit 193 is stopped so that the first imaging unit 192 and the second imaging unit 193 are turned off.

The operation mode of the image processing unit 194 and the communication control unit 195 includes a standby mode and a sleep mode. In the standby mode, electric power to be used for operation is supplied to the image processing unit 194 and the communication control unit 195 so that the units are set in an operable state. In the sleep mode, the supply of electric power to at least one of the image processing unit 194 and the communication control unit 195 is stopped so that at least one of the image processing unit 194 and the communication control unit 195 becomes in a non-operable state.

The operation-mode control section 101 includes a first timer 111 and a second timer 112. The first timer 111 is to be used when switching the system to the sleep mode. The second timer 112 is to be used when turning off the first imaging unit 192 and the second imaging unit 193 and switching the image processing unit 194 and the communication control unit 195 to the sleep mode.

The power control section 102 controls the supply of electric power from the power supply circuit 18 to each unit of the image processing apparatus 10 by being controlled by the operation-mode control section 101. The power control section 102 constantly supplies electric power to the human detection sensor 191.

The approach determining section 103 is executed by the image processing unit 194 and determines whether or not a human within the detection region F2 is approaching the image processing apparatus 10 on the basis of an image acquired by the first imaging unit 192. Specifically, the approach determining section 103 detects the shape of the human from the acquired image and detects the orientation of the human. If the detected orientation of the human is in a direction toward the image processing apparatus 10, the approach determining section 103 determines that the human is approaching the image processing apparatus 10. In other cases, the approach determining section 103 determines that the human is not approaching the image processing apparatus 10.

The stay determining section 104 is executed by the image processing unit 194 and determines whether or not there is a human within the operation region F3 on the basis of an image acquired by the first imaging unit 192.

The authenticating section 105 is executed by the image processing unit 194 and authenticates a user's face on the basis of an image acquired by the second imaging unit 193. Specifically, the authenticating section 105 extracts a facial area from the image acquired by the second imaging unit 193 and compares the characteristics of the extracted facial area with the characteristics of a preregistered valid face image of the user so as to determine whether the extracted face image matches the valid face image of the user. If it is determined that the extracted face image matches the valid face image of the user, the user authentication is successful. If it is determined that the extracted face image does not match the valid face image of the user, the user authentication is unsuccessful.

In addition to the face authentication process (i.e., a first authentication process), the authenticating section 105 also executes an ID-and-password authentication process (i.e., a second authentication process). Specifically, when a user inputs a user ID and a password by operating the operable unit 13 or the display unit 14, the authenticating section 105 compares the input user ID and password with preregistered valid user ID and password so as to authenticate the user. Since ID-and-password authentication does not involve the use of a face image, the ID-and-password authentication is executed by the control unit 11 instead of the image processing unit 194.

Because the authenticating section 105 executes the face authentication process on the basis of the image acquired by the second imaging unit 193, it is assumed that the second imaging unit 193 is turned on. Specifically, the authenticating section 105 becomes operable in a state where the second imaging unit 193 is turned on and the image processing unit 194 is in the standby mode. On the other hand, because the authenticating section 105 is capable of executing the above-described ID-and-password authentication process in addition to the face authentication process, if face authentication is performed simultaneously with ID-and-password authentication, unintended authentication would be performed.

In light of this, when ID-and-password authentication is to be performed, the authenticating section 105 temporarily turns off the face authentication function. In detail, since face authentication is executed by the image processing unit 194, the image processing unit 194 is switched to the sleep mode when ID-and-password authentication is to be executed. In this case, the second imaging unit 193 is maintained in the on state. Specifically, when performing face authentication, the second imaging unit 193 is turned on and the image processing unit 194 is set in the standby mode. In contrast, when performing ID-and-password authentication, the second imaging unit 193 is turned on and the image processing unit 194 is set in the sleep mode. Accordingly, when performing ID-and-password authentication, the face authentication process is suspended so that unintended face authentication is prevented. Alternatively, instead of setting the image processing unit 194 in the sleep mode, the image processing unit 194 may be configured to execute or not execute the face authentication process in accordance with an enable signal or a disenable signal from the control unit 11. In that case, when performing face authentication, the second imaging unit 193 is turned on, and the image processing unit 194 is set in the standby mode and executes face authentication in accordance with an enable signal received from the control unit 11. In contrast, when performing ID-and-password authentication, the second imaging unit 193 is turned on, and the image processing unit 194 is set in the standby mode but does not execute face authentication in accordance with a disenable signal received from the control unit 11. The following description relates to an example where execution or non-execution of face authentication is controlled in accordance with an enable signal or a disenable signal from the control unit 11. However, the exemplary embodiment of the present invention is not limited to this example.

FIGS. 6A to 6F illustrate a positional relationship between the image processing apparatus 10 and a human. FIG. 7 illustrates a timing chart showing transition operation of the image processing apparatus 10.

In an initial state, the operation modes of the system of the image processing apparatus 10, the image processing unit 194, and the communication control unit 195 are switched to the sleep mode, and the first imaging unit 192 and the second imaging unit 193 are turned off.

At a time point t1, when there is no one in the detection region F1 as in FIG. 6A, the human detection sensor 191 does not detect a human, such that a detection signal thereof is in an off state.

At a time point t2, when someone moves into the detection region F1 as in FIG. 6B, the human detection sensor 191 detects the human so that the detection signal thereof becomes in an on state. When the detection signal of the human detection sensor 191 becomes in the on state, the first imaging unit 192 and the second imaging unit 193 are activated and are switched from an off state to an on state, and the image processing unit 194 and the communication control unit 195 switch from the sleep mode to the standby mode.

When activated, the first imaging unit 192 acquires an image of the detection region F2 at predetermined time intervals. When the first imaging unit 192 acquires the image, an approach determination process and a stay determination process are executed.

At a time point t3, when the human moves toward the image processing apparatus 10 in a direction D1 as in FIG. 6C, it is determined in the approach determination process that the human is approaching the image processing apparatus 10, and the system switches from the sleep mode to the standby mode.

At a time point t4, when the user moves into the operation region F3 as in FIG. 6D, it is determined in the stay determination process that the user is staying in the operation region F3, and the system is maintained in the standby mode.

In a period from the time point t4 to a time point t5, that is, in the state shown in FIG. 6D, user authentication is executed. The user authentication involves face authentication or ID-and-password authentication. Alternatively, the user authentication may be executed by concurrently employing face authentication and ID-and-password authentication. When performing face authentication, a user's face image is acquired by the second imaging unit 193.

At the time point t5, when the user finishes using the image processing apparatus 10, performs a predetermined log-out process on the image processing apparatus 10, and moves outside the operation region F3 by turning away from the image processing apparatus 10 as in FIG. 6E, it is determined in the stay determination process that the user is no longer in the operation region F3. In this case, the first timer 111 is activated so as to start measuring a preset time T1.

At a time point t6, when the user moves outside the detection region F1 as in FIG. 6F, the human detection sensor 191 no longer detects the human, whereby the detection signal thereof becomes in an off state. When the detection signal becomes in the off state, the second timer 112 is activated so as to start measuring a preset time T2.

At a time point t7, when the time measured by the second timer 112 exceeds the preset time T2, it is determined whether or not the system is in the sleep mode. If the system is in the standby mode, the standby mode is maintained even when the preset time T2 has elapsed.

At a time point t8, when the time measured by the first timer 111 exceeds the preset time T1, the system switches from the standby mode to the sleep mode. Furthermore, the first imaging unit 192 and the second imaging unit 193 switch from the on state to the off state, and the image processing unit 194 and the communication control unit 195 switch to the sleep mode.

With regard to the second imaging unit 193, the image processing unit 194, and the communication control unit 195, the second imaging unit 193 is turned on and the image processing unit 194 and the communication control unit 195 switch to the standby mode at the timing at which the human moves into the detection region F1 as in FIG. 6B. Furthermore, the system switches from the sleep mode to the standby mode and the operable unit 13 and the display unit 14 are turned on by being supplied with electric power at the timing at which the human approaches the image processing apparatus 10 as in FIG. 6C. Therefore, at this point, user's face authentication or ID-and-password authentication becomes possible. Then, when the preset time T1 elapses after the user finishes operation and moves outside the detection region F1 as in FIG. 6F, the system switches to the sleep mode, the second imaging unit 193 is turned off, and the image processing unit 194 and the communication control unit 195 switch to the sleep mode, so that neither face authentication nor ID-and-password authentication is performed.

Next, the user authentication process in the period from the time point t4 to the time point t5 will be described.

Figure 8:
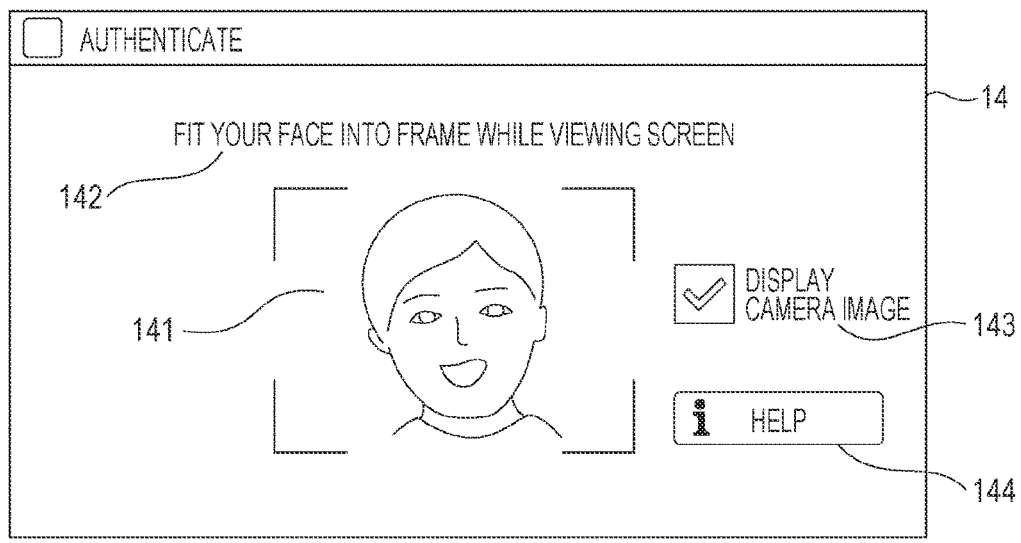
FIG. 8 illustrates a display screen of a display unit.

FIG. 8 illustrates an example of a display screen of the display unit 14. The display unit 14 displays a user's face image 141 acquired by the second imaging unit 193 as well as a message 142 asking to "fit face into frame while viewing screen". If the user desires face authentication, the user may appropriately adjust the position of his/her face relative to the second imaging unit 193 in accordance with this message 142. The second imaging unit 193 outputs the acquired face image to the image processing unit 194. The image processing unit 194 compares the face image with the characteristics of a preregistered valid face image of the user. If the two face images match, the face authentication is successful. It the two face images do not match, the face authentication is unsuccessful, and a message indicating the result is displayed on the display unit 14.

The display unit 14 also displays a help button 144 and a checkbox 143 for setting whether or not to display a camera image. By inputting a check mark in the checkbox 143, the user's face image 141 is displayed on the display unit 14 as shown in FIG. 8. When the check mark is removed from the checkbox 143, the user's face image acquired by the second imaging unit 193 is not displayed on the display unit 14.

If the face authentication is unsuccessful, the user may operate an authenticate button provided at the operable unit 13 or an authenticate touch button displayed on the display unit 14. With this operation, the face authentication mode switches to the ID-and-password authentication mode.

Figure 9:
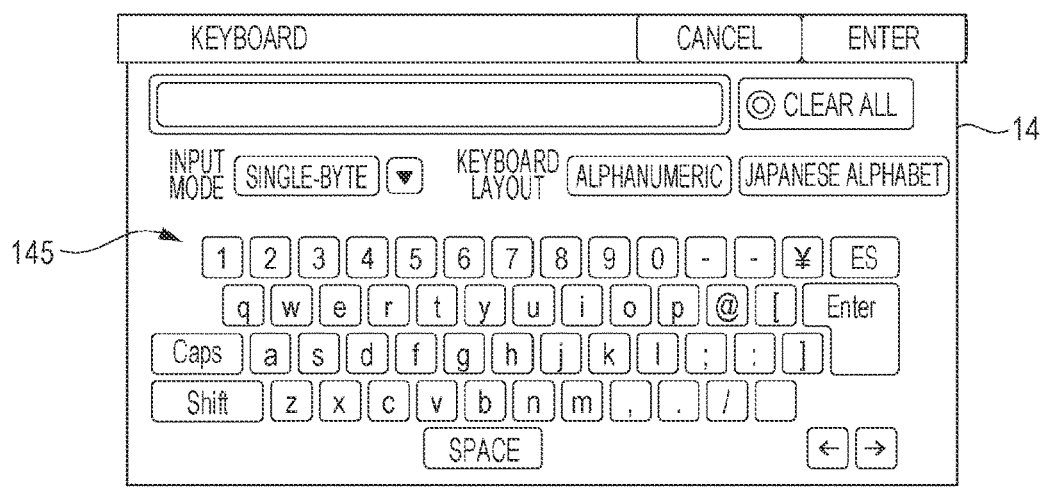
FIG. 9 illustrates a display screen showing a software keyboard.

FIG. 9 illustrates an example of a keyboard displayed on the display unit 14 during ID-and-password authentication. When the user operates the authenticate button, the control unit 11 displays a software keyboard 145 on the display unit 14 so as to allow for input of a user ID and a password. The user operates the software keyboard 145 displayed on the display unit 14 and inputs his/her user ID and password. The control unit 11 compares the input user ID and password with preregistered valid user ID and password and authenticates the user.

When the authenticate button is operated and the software keyboard 145 is displayed on the display unit 14 accordingly, the control unit 11 simultaneously makes the image processing unit 194 suspend the face authentication process. Specifically, the control unit 11 transmits a disenable signal to the image processing unit 194 via the communication control unit 195, and the image processing unit 194 suspends the face authentication process in response to the reception of the disenable signal. In detail, when the image processing unit 194 receives the disenable signal, the image processing unit 194 does not execute any processing on the face image acquired by the second imaging unit 193 and does not output an authentication result to the control unit 11. Alternatively, the control unit 11 may be configured to transmit an enable signal that permits execution of the face authentication process to the image processing unit 194, and the enable signal in an off state (i.e., low binary state) may be used as the disenable signal. Even when the face authentication process is suspended in the image processing unit 194, the second imaging unit 193 is maintained in the on state. After the user authenticated based on the user ID and password finishes using the image processing apparatus 10 and logs off, the control unit 11 transmits an enable signal to the image processing unit 194 again, thus permitting execution of face authentication.

As mentioned above, face authentication and ID-and-password authentication may be used concurrently instead of being used selectively.

FIG. 10 illustrates an example of a screen of the display unit 14 when face authentication and ID-and-password authentication are used concurrently. When face authentication is successful, the user's face image 141 is displayed, and an input field 146 for inputting a password is also displayed. In addition, the display unit 14 displays a message 147 asking to "press authenticate button on control panel if you demand authentication by inputting user ID using keyboard". If the user operates the authenticate button, the software keyboard 145 shown in FIG. 9 is displayed, thereby switching to the ID-and-password authentication mode. When the user inputs a password and operates a log-in button 149, the control unit 11 compares the input user ID and password with preregistered valid user ID and password and authenticates the user. When displaying the software keyboard 145 shown in FIG. 9, the control unit 11 transmits a disenable signal to the image processing unit 194 so as to suspend the face authentication process. Likewise, when displaying the screen shown in FIG. 10, that is, when there is a possibility that ID-and-password authentication may be performed, the control unit 11 may transmit a disenable signal to the image processing unit 194 so as to suspend the face authentication process.

If the password is not correct, the authentication is unsuccessful, and the control unit 11 displays a predetermined error message on the display unit 14. An example of such a predetermined error message is "password is not correct". After the error message is displayed, the user may perform predetermined operation so as to recover the screen in FIG. 10 and input his/her user ID and password again. When displaying the error message, the control unit 11 transmits a disenable signal so as to suspend the face authentication process.

In order to redo face authentication, a "redo face authentication" button 148 is operated. When this button 148 is operated, the control unit 11 displays the screen shown in FIG. 9 again on the display unit 14 so as to execute the face authentication process. Specifically, the control unit 11 transmits an enable signal to the image processing unit 194 and permits execution of the face authentication process. If the face authentication process is unsuccessful, the control unit 11 displays a predetermined error message on the display unit 14. An example of such a predetermined error message is "unsuccessful face authentication". In a case where ID-and-password authentication is unsuccessful, when displaying the error message, the control unit 11 transmits a disenable signal to the image processing unit 194 so as to suspend the face authentication process. On the other hand, when displaying the error message corresponding to an unsuccessful face authentication process, the control unit 11 transmits an enable signal to the image processing unit 194 so as to continuously permit the execution of the face authentication process.

FIGS. 11A to 11D illustrate an example of timing charts according to which user authentication is executed between the time point t4 and the time point t5, that is, in the state shown in FIG. 6D.

FIG. 11A illustrates the state of the second imaging unit 193, which is constantly maintained in the on state from the time point t4 to the time point t5. The second imaging unit 193 switches from the off state to the on state when someone moves into the detection region F1. When the preset time T1 elapses after the human moves outside the detection region F1 by turning away from the image processing apparatus 10, the second imaging unit 193 switches from the on state to the off state.

FIG. 11B illustrates an enable signal transmitted from the control unit 11 to the image processing unit 194. The enable signal is a binary signal of an on state (high state) and an off state (low state). In the on state, the face authentication process is permitted in the image processing unit 194. In the off state, the face authentication process is not permitted in the image processing unit 194.

FIG. 11C illustrates an authentication mode. In the case where face authentication and ID-and-password authentication are to be used concurrently, face authentication is executed for a certain user, and ID-and-password authentication is executed for another user.

FIG. 11D illustrates the operation of the image processing apparatus 10 in a specific period from the time point t4 to the time point t5.

From the time point t4 and onward, the second imaging unit 193 is turned on and the control unit 11 transmits the enable signal in the on state to the image processing unit 194, so that face authentication is permitted. A user who demands face authentication adjusts the position of his/her face relative to the second imaging unit 193 so that the face fits within the frame, as shown in FIG. 8, and the image processing unit 194 executes the face authentication process.

If the user performs operation for demanding ID-and-password authentication at a time point t41 (e.g., if the user operates the help button 144 on the screen in FIG. 8 so as to switch the screen of the display unit 14 from the screen in FIG. 8 to the screen in FIG. 10), the control unit 11 switches the enable signal from the on state (high state) to the off state (low state) and transmits the enable signal to the image processing unit 194. Thus, the face authentication process in the image processing unit 194 is suspended, and the authentication mode is switched to the ID-and-password authentication mode. Even when the authentication mode is switched to the ID-and-password authentication mode, the second imaging unit 193 is still maintained in the on state.

When the authentication mode is switched to the ID-and-password authentication mode at the time point t41 and the authentication is successful at a time point t42, the authenticated user is permitted to log in and operate the image processing apparatus 10. Thus, the user may perform desired operation for commanding, for example, scanning of a document, copying of a document, facsimile transmission of a document, or printing of a document. During this time, the second imaging unit 193 is set in the on state but the enable signal is still in the off state (low state). Therefore, the face authentication process is maintained in the suspended state. Consequently, the ID-and-password-authenticated user may be prevented from experiencing unintended face authentication while operating the image processing apparatus 10.

When the authenticated user finishes the operation and logs out at a time point t43, the control unit 11 detects the log-out and switches the enable signal from the off state to the on state. Subsequently, face authentication is executed again so that when another user approaches the image processing apparatus 10 to use the image processing apparatus 10, face authentication is immediately executed so long as the user demands face authentication. Because the second imaging unit 193 is maintained in the on state, a reactivation process for the camera of the second imaging unit 193 may be omitted.

Instead of switching the enable signal to the on state simultaneously with the detection of the log-out, the control unit 11 may switch the enable signal to the on state at a point when there is no one in the operation region F3, or may switch the enable signal to the on state when a predetermined time has elapsed after the log-out.

FIG. 12 collectively illustrates the relationships among the display screen of the display unit 14, the state of the second imaging unit 193, and the execution state of face authentication, in accordance with this exemplary embodiment.

A display screen A is to be displayed on the display unit 14 after the system of the image processing apparatus 10 switches to the standby mode, and shows a face image, which is acquired by the second imaging unit 193, of a human existing in the operation region F3. In this state, the second imaging unit 193 is turned on, that is, the second imaging unit 193 is in an activated state by being supplied with electric power and is capable of acquiring a face image, and the image processing unit 194 is capable of executing the face authentication process.

A display screen B is to be displayed at a point when face authentication is successful in a case where face authentication and ID-and-password authentication are used concurrently. A password input field is displayed on the display screen B. In this case, the second imaging unit 193 is turned on, and the face authentication process is suspended in the image processing unit 194. Although the user's face image is still being acquired by the second imaging unit 193 on this display screen B, the face authentication process is suspended. Alternatively, the user's face image acquired by the second imaging unit 193 may be not displayed on the display screen B. When the user operates the "redo face authentication" button on this display screen B, the display screen B switches to the display screen A so that the face authentication process becomes executable again in the image processing unit 194. On the other hand, when the authenticate button of the operable unit 13 is operated while this display screen B is displayed, the display screen B switches to a software keyboard screen.

A display screen C displays a software keyboard used for inputting a user ID and a password. In this state, the second imaging unit 193 is turned on, and the face authentication process in the image processing unit 194 is suspended. When the user inputs a user ID and a password and operates the log-in button, ID-and-password authentication is executed.

A display screen D corresponds to when the ID-and-password authentication is unsuccessful. A predetermined error message is displayed on the display screen D. In this state, the second imaging unit 193 is turned on, and the face authentication process in the image processing unit 194 is suspended. When a close button is operated on this display screen D, the display screen D switches to the display screen B where a user ID and a password are input again. The second imaging unit 193 is turned on, and the face authentication process in the image processing unit 194 is still suspended.

A predetermined error message is also displayed when the face authentication executed on the display screen A is unsuccessful. However, unlike the error message on the display screen D, this error message indicates that the face authentication is unsuccessful. Therefore, the face authentication process in the image processing unit 194 is maintained in the executable state. Alternatively, in this case, the face authentication process in the image processing unit 194 may be switched from the executable state to a suspended state, as in the display screen D.

Accordingly, in this exemplary embodiment, when performing ID-and-password authentication, the face authentication process is suspended while the second imaging unit 193 is maintained in the on state, thereby preventing execution of unintended face authentication. Furthermore, since the second imaging unit 193 is maintained in the on state, an activation process for the camera may be omitted even when switching to the face authentication mode, whereby face authentication may be executed quickly.

Although the exemplary embodiment of the present invention has been described above, the present invention is not limited to the above exemplary embodiment, and various modifications are permissible.

For example, although the second imaging unit 193 is maintained in the on state and the face authentication process in the image processing unit 194 is suspended during ID-and-password authentication in this exemplary embodiment, the second imaging unit 193 may be maintained in the on state and the face authentication process in the image processing unit 194 may be suspended even after the face authentication is successful so as to continuously prevent the user from experiencing face authentication. In detail, when face authentication is executed at the display screen A in FIG. 12 and the face authentication is successful at the image processing unit 194, a detection signal indicating the result is transmitted from the communication control unit 195 to the control unit 11. The control unit 11 switches the enable signal from the on state to the off state in response to this detection signal and suspends a subsequent face authentication process in the image processing unit 194. Then, when the authenticated user finishes operation and logs out or when the authenticated user moves outside the operation region F3, the control unit 11 switches the enable signal to the on state again. By maintaining the second imaging unit 193 in the on state even after the face authentication is successful, subsequent face authentication may be executed quickly.

Furthermore, in this exemplary embodiment, ID-and-password authentication is performed by inputting a user ID and a password via a software keyboard. Alternatively, the exemplary embodiment may be similarly applied to ID-and-password authentication based on an ID card (including a magnetic card or an integrated-circuit (IC) card). Specifically, the user is authenticated by holding an ID card to a predetermined ID card reader of the image processing apparatus 10. In this case, the control unit 11 may maintain the second imaging unit 193 in the on state at the timing at which the ID card is detected, and switch the enable signal from the on state to the off state so as to suspend the face authentication process in the image processing unit 194.

In this exemplary embodiment, the face authentication process in the image processing unit 194 is suspended while the second imaging unit 193 is maintained in the on state. The expression "the on state of the second imaging unit 193" refers to an activated state in which the second imaging unit 193 is capable of acquiring a user's face image by being supplied with electric power, and may include a power-saving mode so long as the activated state allows for acquisition of a face image. The suspension of the face authentication process in the image processing unit 194 may include a mode in which a face image acquired by the second imaging unit 193 is not input, a mode in which a face image acquired by the second imaging unit 193 is input but the characteristics are not extracted from the face image, a mode in which a face image acquired by the second imaging unit 193 is input and the characteristics are extracted therefrom but the characteristics are not compared with preregistered characteristics, and a mode in which a face image acquired by the second imaging unit 193 is input, the characteristics are extracted therefrom, and the characteristics are compared with preregistered characteristics, but the comparison result is not output. Moreover, the term "suspension" refers to temporary stoppage of the face authentication process and is to be interpreted that it includes any state where the face authentication process is not executed. The execution state of face authentication in the image processing unit 194 may alternatively be referred to as "operational state", and the suspended state of face authentication in the image processing unit 194 may alternatively be referred to as "non-operational state".

The foregoing description of the exemplary embodiment of the present invention has been provided for the purposes of illustration and description. It is not intended to be exhaustive or to limit the invention to the precise forms disclosed. Obviously, many modifications and variations will be apparent to practitioners skilled in the art. The embodiment was chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An image processing apparatus comprising:
a camera that acquires a face image of a user;
at least one central processing unit (CPU) configured to perform a first authentication process based on the face image and a second authentication process based on information other than the face image,
wherein the at least one CPU performs the first authentication process and, after the first authentication process is performed and fails, in response to receipt of a user instruction to switch to the second authentication process the at least one CPU suspends the first authentication process while maintaining the camera in an activated state while the second authentication process is performed, and
wherein in response to the second authentication process being successful, the at least one CPU controls to operate the image processing apparatus, detects a logout and removes the suspension of the first authentication process.

2. The image processing apparatus according to claim 1, wherein the second authentication process is performed on the basis of a user ID and a password, and
wherein the at least one central processing unit (CPU) suspends the first authentication process while maintaining the camera in the activated state when one of the user ID and the password is input.

3. The image processing apparatus according to claim 1, wherein when the first authentication process is to be performed, the at least one central processing unit (CPU) transmits an enable signal to enable the first authentication process, and when the second authentication process is to be performed, the at least one central processing unit (CPU) transmits a disenable signal to disable the first authentication process.

4. The image processing apparatus according to claim 1, further comprising:
a power controller; and
a detector that detects a human within a detection region, wherein when the detector detects a human, the camera is set in the activated state by being supplied with electric power from the power controller, and the at least one central processing unit (CPU) permits the first authentication process, and wherein when the detector does not detect a human, the supply of the electric power to the camera is stopped.

5. The image processing apparatus according to claim 1, wherein the at least one central processing unit (CPU) performs the second authentication process in response to a selection by the user.

6. The image processing apparatus according to claim 1, wherein the user instruction is received by activation of an authentication button on a touch screen.

7. The image processing apparatus according to claim 6, wherein the authentication button is an authenticate touch button displayed on a touch screen of the image processing apparatus.

8. A non-transitory computer readable medium storing a program causing a computer to execute a process for performing image processing, the process comprising:
performing a first authentication process based on a user's face image acquired by an imaging unit;
after the first authentication process is performed and fails, in response to receipt of a user instruction to switch to a second authentication process, suspending the first authentication process while maintaining the imaging unit in an activated state while the second authentication process is performed, the second authentication process being performed based on information other than the face image; and
in response to the second authentication process being successful, controlling an image processing apparatus to operate, detecting a log-out and removing the suspension of the first authentication process.

9. An image processing method comprising:
acquiring a face image of a user by using an imaging unit;
performing a first authentication process based on the face image;
after the first authentication process is performed and fails, in response to receipt of a user instruction to switch to a second authentication process, suspending the first authentication process while maintaining the imaging unit in an activated state while the second authentication process is performed; and
in response to the second authentication process being successful, controlling an image processing apparatus to operate, detecting a log-out and removing the suspension of the first authentication process.

* * * * *